United States Patent [19]

Palmquist

[11] 4,430,109
[45] Feb. 7, 1984

[54] METHOD OF REGULATING FUEL AND AIR FLOW TO A GLASS MELTING FURNACE

[75] Inventor: Ronald W. Palmquist, Horseheads, N.Y.

[73] Assignee: Corning Glass Works, Corning, N.Y.

[21] Appl. No.: 415,405

[22] Filed: Sep. 7, 1982

Related U.S. Application Data

[62] Division of Ser. No. 243,811, Mar. 16, 1981, Pat. No. 4,366,571.

[51] Int. Cl.³ ............................................. C03B 5/00
[52] U.S. Cl. ......................................... 65/32; 65/134; 65/135; 65/136
[58] Field of Search .................... 65/134, 135, 136, 32

[56] References Cited

U.S. PATENT DOCUMENTS

| | | | |
|---|---|---|---|
| 1,421,211 | 6/1922 | Good | 65/134 |
| 3,325,268 | 6/1967 | Penberthy | 65/134 |
| 3,656,924 | 4/1972 | Chapman | 65/134 X |

FOREIGN PATENT DOCUMENTS

297590  3/1971  U.S.S.R. .................................. 65/32

Primary Examiner—Arthur D. Kellogg
Attorney, Agent, or Firm—B. R. Turner; J. P. DeLuca

[57] ABSTRACT

A method and apparatus for melting thermoplastic material is disclosed utilizing, in a preferred embodiment, a vessel having a bottom wall and upstanding sidewalls. A protective liner for the vessel is provided, being formed of corrosion resistant material. The furnace may include both through-the-batch and floor electrodes, and also hot spot fining to a conductive outlet channel.

A method is set forth for operating the furnace described herein utilizing symmetrical, below the batch heat dissipation for accelerated melting. In order to protect the liner, which in some instances may be fabricated from an oxidizable refractory metal, start-up burners are operated under a reduced oxygen supply.

3 Claims, 10 Drawing Figures

METHOD OF REGULATING FUEL AND AIR FLOW TO A GLASS MELTING FURNACE

This is a division of application Ser. No. 243,811, filed Mar. 16, 1981 now U.S. Pat. No. 4,366,571.

BACKGROUND OF THE INVENTION

This invention relates to a relatively high temperature furnace for melting thermo-plastic materials. More specifically, the furnace is adapted for melting glass wherein the furnace enclosure is a vessel particularly suited to resist the corrosive effects of the glass at temperatures in excess of 1800° C. Means are described for enhancing thermal efficiency and for protecting the furnace during startup. Other details are also hereinafter described in the specification.

Refractory lined furnaces have been used for many years to melt glass. Many standard refractories, however, have a tendency to become slowly dissolved or corroded by the glass until the furnace begins to leak. The rate of this corrosion increases rapidly with increasing temperature and glass fluidity. While repairs may be made, they are usually difficult to effect, expensive, and usually short lived. The refractory may be cooled on the outside surface to slow down this corrosion, but at a cost of higher energy losses.

The most severe corrosion usually occurs at the sidewalls near the top of the glass bath. In conventional furnaces the glass is hottest near the top, and melting and refining temperatures are limited by the refractory capabilities to less than 1600° C. As the refractory dissolves into the glass many of the corrosion products are swept into the molten bath. The dissolved refractory materials become part of the glass composition and in some cases may have a deleterious effect on glass quality. The heavier corrosion products tend to sink to the bottom of the furnace and form a somewhat loosely arranged protective layer for the bottom wall.

Another area where the refractory corrosion tends to be high is at the throat or exit portion of the furnace. Many times such exit areas are clad with metals for protection. In the disclosure of Spremulli, U.S. Pat. No. 4,029,887 a molybdenum (moly) pipe was used to provide a highly corrosion resistant conduit from a furnace to a forehearth channel. Platinum too, has been used for exit liners. In fact entire furnaces may be platinum lined, but at extremely high cost.

In vertical electrical melting units, an example of which is disclosed in U.S. Pat. No. 3,524,206, the top of the molten bath is covered with a cold batch blanket. Corrosion in this type of furnace is typically most severe in the upstanding sidewall near the so-called fusion line and around the electrodes entering through the sidewall. The present invention provides means for substantially reducing such corrosion and/or minimizing its effect.

In conventional vertical electric melters, having a cold batch blanket, there is a tendency to retain seeds in the glass since there is no free surface to allow for the rapid escape of bubbles trapped in the glass. Therefore residence time of glass in the furnace must be regulated to assure sufficient fining. Since freshly melted glass tends to move quickly toward the exit before it can be refined, the fast moving glass sets up unwanted convection currents which contribute to furnace deterioration. Thus, steps must be taken to control convection currents and increase the residence time of the glass in the furnace. One such method is described in U.S. Pat. No. 4,143,232, wherein controlled convection currents are produced by deeply immersed electrodes activated in a selected firing arrangement. Another advantage of the latter arrangement is that the heat produced is concentrated away from the walls, thus reducing corrosion around the electrode openings therein. In the present invention an improved arrangement of electrodes is adapted to provide concentrated central heating of the glass and hot spot fining.

Molybdenum, platinum, platinum alloys, and to some extent steel alloys and iron have long been recognized as materials having a higher resistance to wear than conventional refractory and are considered useful in the construction of glass melting furnaces. Molybdenum, for example, has been used as an electrode material and as a lining for stirrer wells where high glass velocities produce rather severe corrosion. As mentioned above, furnace outlets are often lined with platinum and sometimes molybdenum.

Platinum is extremely expensive and its use is often limited to the melting of special glasses such as ophthalmic or optical glasses. Iron may be used, as disclosed in British Pat. No. 601,851, but it has a relatively low melting point and it can contaminate most glasses with colorants. For certain purposes, however, it may be an acceptable furnace liner material.

Moly is recognized as a metal that has high temperature strength, is relatively inexpensive, and is chemically compatible with many glasses. A distinct disadvantage of this material is that it will oxidize above 550° C. In the past it has been difficult to fabricate. Now that moly can be formed into flat or curved plate and pipe and welded into structures, it is a more attractive material. One of the most extraordinary advantages of moly, which melts at 2600° C., is its high temperature strength which allows it to be used up to about 2200° C. Note for example that platinum, which has heretofore been used almost exclusively in high temperature work, melts at 1730° C. and can be used up to only about 1600° C. Thus, moly is an extremely useful material since it is substantially less expensive than platinum and has a much higher melting point.

The U.S. Patent to Silverman, No. 3,109,045, suggests the use of molybdenum as a vessel material in a glass melting furnace. A molybdenum crucible portion is submerged in an external bath of thermoplastic material to protect the exterior portion thereof from oxidation. The interior portion of the crucible is filled with molten thermoplastic material, thus the moly is protected from the ambient atmosphere and will not oxidize. Further, although the exterior of the moly crucible is protected by glass, a refractory tank or containment vessel for the exterior bath into which the moly crucible is located is large in comparison to the latter. Thus, the molten glass surrounding the vessel will have freedom to convect and ultimately destroy the refractory containment vessel.

The Silverman unit is of a size and configuration adapted for specialty melts and would be impractical to scale up. In addition it requires a purge gas arrangement to remove air from the batch materials during operation for the purpose of protecting the upper portion of the moly vessel from oxidation. Also, since the batch materials for most glasses will contain oxidizing agents such as $CO_2$, $SO_2$ and $H_2O$, the batch cannot be allowed to contact the moly. On the other hand, if the glass level is maintained above the moly, it will contact the refractory ring which sits on top of the moly, thus causing the refractory to quickly corrode.

Gas firing of batch materials would be difficult to implement in a moly furnace without deleterious effects because the heat and oxygen in the flame is highest at the glass surface, precisely where protection against corrosion and oxidation is needed. Thus, without the precautions hereinafter suggested by the present invention, a moly liner would oxidize since it would be exposed to the combustion gases.

Joule heating is a preferred method of melting glass in a furnace of the type described herein, especially a moly lined furnace. However, since molybdenum is a conductive metal, one must place the electrodes in selected locations and provide appropriate circuitry in order to optimize current flow in the glass. While it is normally desirable to avoid a short circuit to the liner, it may be desirable to place the electrodes and provide circuitry so that some current flows to the liner for providing uniform power dissipation. Moreover, it is possible to fire directly to the liner if desired. Batch electrodes may be suitable for this purpose and various arrangements are illustrated in U.S. Pat. Nos. 2,215,982; 2,978,526 and 4,159,392. In a preferred arrangement of the present invention it is contemplated to use movable batch electrodes. While the '526 patent discloses such a concept, the arrangement is limited in flexibility and would drastically interfere with the proper filling of the furnace.

In a series of related U.S. Pat. Nos. 4,351,664; 4,352,687 and 4,365,986 assigned to the assignee herein, various arrangements of glass transport and conditioning systems useful with the present invention are disclosed in detail. It should be understood that, to the extent necessary, the teachings of said applications should be considered incorporated herein by reference.

SUMMARY OF THE INVENTION

A method and apparatus for melting thermoplastic material is disclosed utilizing, in a preferred embodiment, a vessel having a bottom wall and upstanding sidewalls. A protective liner for the vessel is provided, being formed of corrosion resistant material. The furnace may include through-the-batch and floor electrodes and hot spot fining to a conductive outlet channel.

A method is proposed for operating the furnace described herein utilizing symmetrical below the batch heat dissipation, for accelerated melting. In order to protect the liner, which in some instances may be fabricated from an oxidizable refractory metal, start up burners are operated with reducing fires.

DESCRIPTION OF THE PREFERRED EMBODIMENTS

Figures 1, 2, 3, 4, 5:
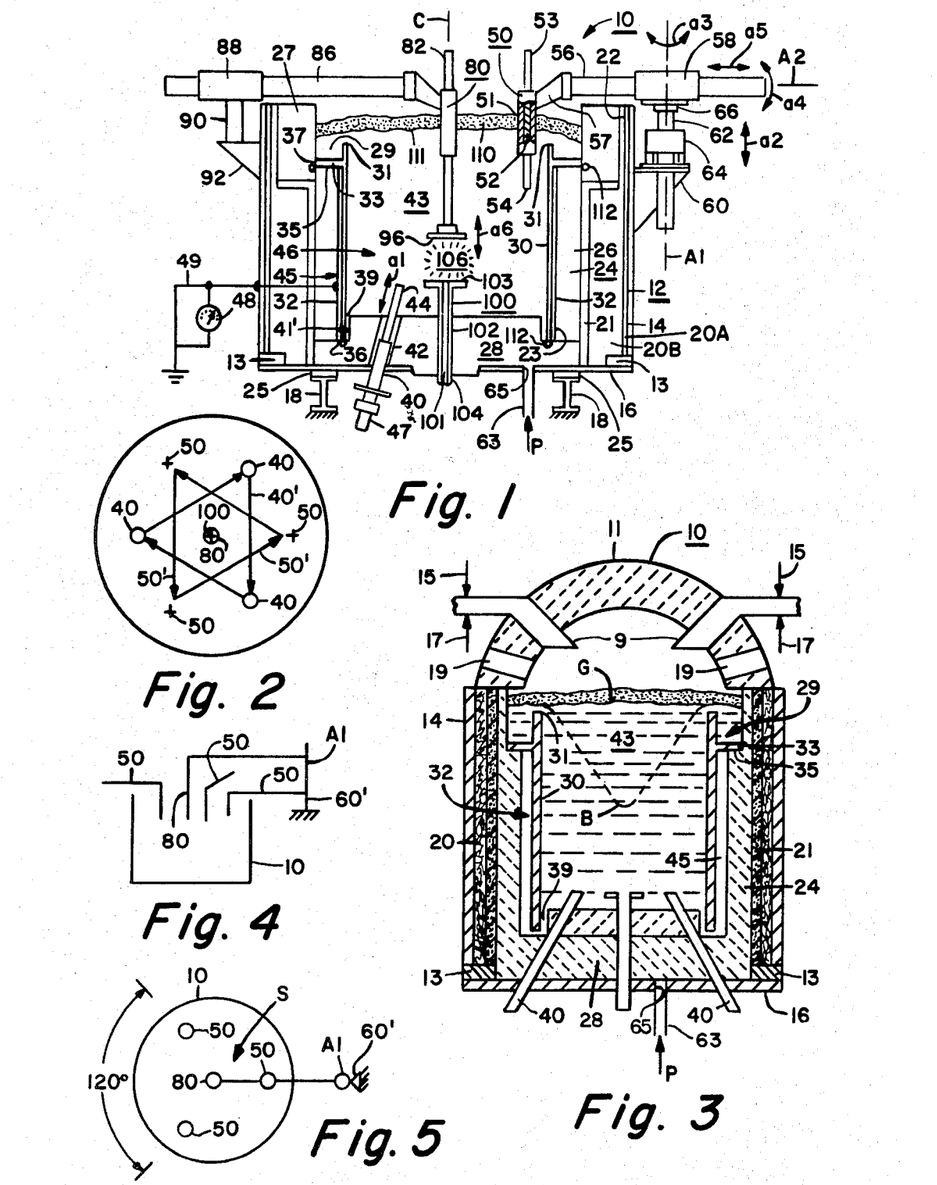
FIG. 1 is a somewhat schematic elevational view in section of a lined furnace, with cross section lines eliminated for clarity of presentation, illustrating significant features of the present invention.
FIG. 2 is a schematic view of a preferred electrode arrangement with superimposed phasors.
FIG. 3 is a schematic sectional view in elevation of a lined furnace in a start-up mode.
FIGS. 4 and 5 are respective side and top plan schematic views of an electrode arrangement.

The furnace of the present invention 10 includes an outer shell 12 having upstanding generally cylindrical, round, polyhedral, square, or rectangular sidewalls 14 and a bottom wall 16. The bottom wall 16 may be in segmented sections to accommodate thermal expansion, which sections may be electrically isolated one from the other. The shell 12, forming a main support structure for the furnace 10, should be relatively air tight, electrically isolated from bottom wall 16 by an insulating shim 13, and may be fabricated from steel plate. Shim 13 also allows for thermal expansion. The furnace 10 is supported from the bottom by "I" beams 18, which may be electrically isolated from ground by means of insulating shims 25.

A layer of compressible insulation 20A such as FIBER FRAX ® manufactured by Carborundum may be located immediately interior of the shell 12 and extends from the bottom wall 16 to an upper lip 22 thereof. The compressible insulation 20A allows for the relative movement of the structural materials during thermal cycling of the furnace. An annular formation of rigid insulation 20B is located adjacent the compressible insulation layer 20A.

A refractory vessel 24 including upstanding sidewalls 26 and refractory bottom wall 28 is located within the shell 12 in spaced relation with the rigid insulation 20B. Ramming mix 21 is placed between the rigid insulation 20B and the refractory vessel 24 to form a glass tight seal therebetween. Ramming mix, sometimes hereinafter referred to as tamp 21, is a granular refractory material which may be packed or tamped in position and fired or sintered on furnace startup. The vessel 24 is preferably manufactured from known refractory materials resistant to glass corrosion. Coaxially located within the refractory vessel 24 there is provided a liner 30 preferably formed of a highy corrosion resistant refractory metals.

Molybdenum appears to be a useful and preferred material for the liner 30 although tantalum, rhenium, niobium, and tungsten may also be suitable. Noble metals (e.g. platinum, rhodium, etc.) may also be suitable for the liner in some situations, especially where the glass is highly oxidized. The latter materials are relatively weak at high temperatures and may therefore require bracing or integral ribbing, not shown, to lend additional support to the liner 30. In such a situation where the glass is highly oxidized cathodic or DC bias may be imposed on the liner in conjunction with an anionic sacrificial electrode. Such an arrangement would be less costly than using noble metals. It should also be mentioned that, for relatively low temperature melting of frits and the like below about 1100° C. steel and nickel alloys may be useful. Electrodes, hereinafter described for electrically firing the furnace 10, may be fabricated from the above materials but with the same preference for moly. The other materials which are noted as being useful are not emphasized because, unless there is some special reason to use them, they are considerably more expensive.

In a preferred embodiment the liner 30 is fabricated from formed moly plates riveted together along lapped seams, no other reinforcement being deemed necessary. Also plates of the above materials could be used as shields for the vessel if tightly spaced with each other.

Upstanding walls 26 of the vessel 24 and the liner 30 are in close proximity, leaving a relatively narrow annular space 32 therebeween, which may extend from essentially intimate contact to some wider preferred spacing of about 1 inch or so. For reasons hereinafter set forth the space 32 may be filled with ground noncorrosive high viscosity glass cullet, batch or another layer of refractory tamp (see reference numeral 23).

It is important that the function of liner 30 be understood. The liner 30 shields refractory vessel 24 from corrosion caused by the convecting thermoplastic material (glass) 43 within the furnace 10. Further and very importantly the liner 30 makes it possible to increase melting rates and improve glass quality. The former is accomplished as a result of the higher temperatures at which the furnace 10 may be operated. The higher glass quality results from the fact that moly produces less contamination of the glass than refractory. No matter what refractory is used for contact with glasses in conventional melting tanks, it will eventually corrode and contaminate the glass. Additionally, refractory blocks, especially the larger ones will crack because of thermal shock. Spaces between courses of refractory blocks and cracks will allow inspiration of air into the refractory which will react causing introduction of reactants into the glass. Outgassing of the refractory due to the intense heat of glass furnaces also introduces contaminants into the glass. Glass quality, which is a measure of the absence of defects and contaminants (e.g. cord, seeds, stones, etc.), is affected by all of the above factors prevalent in conventional melting tanks. Thus the liner 30 not only protects the refractory vessel from corrosion as noted above, it allows the melting of glass against an impermeable vessel wall thereby blocking the communication of contaminants to the glass.

Since it appears that molybdenum is the most highly corrosion resistant liner material presently available for economical high temperature operation, it is the preferred material choice. Molybdenum, being rapidly oxidizable at temperatures above 550° C., must be shielded from oxygen. In the preferred embodiment of the invention the liner 30 is positioned below the glass level by maintaining the glass level above the upper margin 31 thereof, thus protecting the inside surface of the liner. The materials closely packed in space 32 and trap 29 shield the outside surface of liner 30 from oxygen contamination.

The bottom wall 28 of the furnace 10 may be comprised primarily of refractory, or it may be lined with various materials including the same material forming the walls of the liner 30. However, for purposes of explanation herein, a furnace with a refractory bottom will be described and the other variations will be described hereinafter with reference to FIGS. 7-10.

It is also contemplated herein that a mixture of tightly packed sand, ramming mix and high viscosity (i.e. hard) glass cullet could be used in place of the layers of refractory 24, insulation 20A and 20B and tamp 21-23 described above. Thus, the liner 30 with or without a bottom wall could be located within a granular formation surrounded by outer shell 12 and offset block 27 (hereafter described). In such an arrangement the sand, cullet and tamp would not greatly insulate but would provide protection for the liner 30, because upon application of heat such materials would form a high viscosity composite of glass and molten or semi-molten materials shielding the liner 30 from oxygen. Heat transfer losses by convection currents externally of the liner would be greatly reduced because molten or semimolten sand would be highly viscous. An exemplary but nonexhaustive list of useful materials includes sand, silica or zirconia; ramming mix—Corhart #893 or #251420.

If bottom or floor electrodes 40, hereinafter described, are incorporated into the furnace, the bottom wall 28 should be an unlined high resistivity refractory such as Corhart #1350 Zircon having an electrical resistivity above 100 ohm-inches at 1800° C. Although not shown in FIG. 1, liner 30 may be provided so as to extend across bottom wall 28, especially if the melting application is for a hard glass at high temperature. Such an arrangement would preclude the practical use of bottom electrodes because of the low resistivity of the liner 30 material.

In FIG. 1, only one bottom electrode is shown in order to simplify the drawing. It may be angularly disposed in an opening 42 in the bottom wall 28 and extend into the interior space 46 of the furnace. While electrical connections are not shown, each bottom electrode 40 may be energized by a connection at its distal end 47. Firing occurs primarily from the tip 44 into molten thermoplastic material 43 within the space 46. The bottom electrode 40 may be movable so the tip 44 may be axially adjusted in the direction of the arrows $a_1$, adjacent same.

A plurality of batch electrodes 50 may also be used to melt the thermoplastic material 43. Again, in order to simplify the drawing, only one is shown. Each is adapted to be positioned about the periphery of the furnace 10 and have various degrees of freedom of orientation. The batch electrode 50 may include an outer metal or ceramic sleeve portion 51 and inner concentric refractory metal electrode rod 52. It may be energized by an electrical connection (not shown) at its distal end 53 while its tip 54 is located in the space 46. The electrode rod 52 is preferably adjustable along axes A1 and A2. The batch electrode 50 is horizontally supported by arm 56 journaled in sleeve 58. Support structure 60 attached to the shell 12 carries the sleeve 58 via a shaft 62 sleeved in support 64.

In operation, the support structure 60 remains fixed with respect to the shell 12, however the shaft 62, sleeved within the support 64, is movable axially in the direction of the double headed arrow $a_2$. The horizontal sleeve 58 is rotatably mounted to upper end 66 of shaft 62, see arrow $a_3$. The support arm 56 carried in sleeve 58 may thus be rotated about a vertical axis A1 of shaft 62 as shown by arrow $a_3$. The horizontal support arm 56 may be rotated about the horizontal axis A2 as shown by arrow $a_4$, and also may be moved therealong in the directions shown by arrow $a_5$. The batch electrodes 50 need not be vertical as shown. They may be made tiltable by modifying bracket 57 that holds electrode 50 to arm 56.

The batch electrode 50 carried by the above-described supporting structure 60 etc. is movable up and down, radially with respect to centerline C of the furnace 10, angularly of the vertical and arcuately in the horizontal. Thus, each electrode 50 has degrees of freedom whereby it may be adjustably oriented during operation to any one of a selected set of coordinates within the space 46.

A center batch electrode 80 is vertically oriented along centerline C of the furnace 10 and is similarly energized at its distal end 82 by an electrical connection (not shown). It is coupled to a horizontal support 86 which in turn is mounted in horizontal sleeve 88, vertical shaft 90, and supporting structure 92 fixed to shell 12. The center batch electrode 80 is adapted to move vertically in the direction of the double headed arrow $a_6$ to regulate the location of its tip 96. It may be arranged to be supported from the same arm (e.g. 56) as one of the batch electrodes 50 to save space above the furnace 10. For example, in FIGS. 4 and 5 the center electrode 80 and batch electrode 50 could be supported by the same support 60', one above the other along axis A1. Such an arrangement, with other batch electrodes 50 located 120 degrees apart, exposes a good deal of the top surface of the furnace 10 for ease of filling.

In another embodiment of the invention floor electrodes are shut down and additional batch electrodes (not shown) are substituted therefor in approximately the same circumferentially staggered location relative to the batch electrodes 50. Such an arrangement of six batch electrodes spaced approximately 60° apart about centerline C results in a highly symmetrical electrode arrangement with heat applied near the upper portion of the furnace 10 where most efficient melting occurs.

It has also been found that if the tips 54 and 44 of respective electrodes 50 and 40 are located approximately midway between the centerline C of the furnace and the walls of liner 30, the melting process appears to be enhanced. For a relatively small version of the furnace 10, i.e. approximately 4-6 feet in diameter, the electrodes 50 should be about one half the distance from centerline C to the liner 30 and symetrically located thereabout. Other arrangements are of course possible and will be described hereinafter.

It appears that both batch electrodes 50 and floor electrodes 40 are most useful for somewhat different functions. Floor electrodes 40 are particularly suited for start up before insertion of batch electrodes 50. Also the floor electrodes 40 may be used during full operation for trimming and fine control. Batch electrodes 50 are primarily for full time melting at high rates and can be useful alone. The center batch electrode 80 is primarily useful for fining hard or difficult to melt glasses. Further, the electrodes 50, 40 and 80 may be operated either alone or in combination so that the furnace is rendered extremely versatile. It should be appreciated that although not detailed herein electrodes 40, 50 and 80 may be water cooled by providing an external jacket or the like for carrying cooling water. Such an arrangement prolongs electrode life.

An outlet pipe 100 having a central through opening 101 is disposed in an opening 102 in refractory bottom 28 and is preferably fabricated from the same material as the liner 30, namely molybdenum. An electrical connection, not illustrated, is coupled to the outlet pipe 102 at or near distal end 104. The outlet pipe 100 may thus be energized with its tip 103 firing to the tip 96 of center electrode 80 through the molten thermoplastic material 43. Since pipe 100 may suffer corrosion by electrical firing, center electrode 80 which is more easily replaced may be electrically biased with a DC potential so that it becomes a sacrificial electrode.

Upon energization of the center batch electrode 80 and outlet pipe 100 a hot spot 106 is created in the bath of thermoplastic material 43 by the passage of large currents therebetween. The tip 96 of center electrode 80 and corresponding tip 103 of outlet pipe 100 may be large surface area disks, capable of carrying high current. The energy dissipated in hot spot 106 fines the material 43 just before it leaves the furnace 10 through the opening 101 in outlet pipe 100. The fining temperature being highly elevated and concentrated near the center of the furnace helps to reduce furnace wall deterioration.

Figure 9:
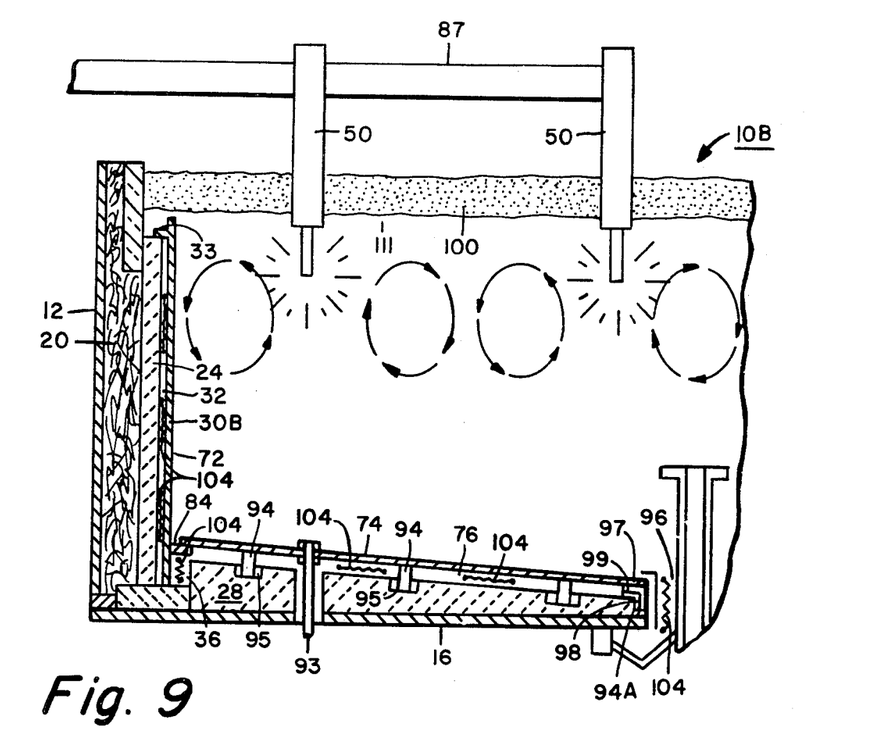
FIG. 9 is a fragmented illustration of a large furnace featuring multiple batch electrodes, a lined bottom and supports therefor.

In order to further reduce furnace wall temperatures, the refractory vessel 24 has its vertical upstanding wall 26 stepped near upper margin 31 of liner 30. Refractory block 27 may be offset as shown in FIG. 1 or FIG. 9 to provide the step in wall 26, or the wall per se may be recessed as shown in FIG. 3. Upstanding refractory wall 26 is thereby radially recessed at its upper extent away from the liner 30, so that the temperature of the material near block 27 is reduced to a point where corrosion by molten thermoplastic material 43 (e.g. glass) and batch 110 is insignificant.

A channel or trap 29 is formed between the liner 30 and the recessed or offset block 27. In one embodiment, the trap 29 may be filled during start-up with noncorrosive glass which will melt and slowly flow into space 32. A horizontal flange 33 of the liner 30 extends radially outwardly to cover an upper face 35 of refractory wall 26. After startup, the flange 33 inhibits the flow of molten material 43 located in the trap 29 from rapidly seeping into the space 32, since the outward margin 37 of flange 33 is coolest near block 27 and the glass in this location is most viscous. Also, corrosion of block 27 is reduced because it too is remote from the high heat in the center portion of the furnace 10.

At a bottom end 36 of the liner 30, a slot 39 is formed between the bottom wall 28 of the refractory vessel 24 and the liner 30. The slot 39 traps and collects a mixture 41' of molten thermoplastic material and corrosion products of the refractory. The molten material at the bottom of slot 39 is significantly cooler than other portions of the furnace 10, and thus, there is a tendency for the mixture 41' trapped therein to have a high viscosity and/or to devitrify, and thereby act as a seal between molten material 43 within chamber space 46 and the material in liner space 32.

Similarly, the space 32 between the liner 30 and the upstanding refractory wall 26 is narrow, and thus convection currents caused by the heat in the furnace 10 are eliminated or substantially reduced within such space thereby materially reducing convection corrosion of the refractory. The space 32 acts as a trap for a mixture 45 of corrosion products and thermoplastic material. Since corrosion products confined in the space 32 are not continually swept away, corrosion of the refractory is inhibited.

Although passive cooling should be effective to seal space 32 and prevent the circulation of the material retained therein, if desired one or more cooling pipes 112 may be provided to carry cooling gas near end portions or margins 36 and 37 of liner 30. The resultant extra cooling would thoroughly assure a seal by virtue of frozen glass adjacent the ends of the liner space 32.

Variations of the above mentioned methods and apparatus for protecting refractory from corrosion and establishing cool and/or narrow zones to impede convection currents in sensitive areas of the furnace are available. Examples include extension of the flange 33 into the offset block 27, flanging the bottom end 36 of liner 30 into sidewall 26 and the like. All of the above are designed to locate interfaces of the liner 30 and refractory vessel 24 to positions which are relatively cool and/or restricted in volume so that glass motion is impeded. Further, if a nonoxidizable liner were used, the upper margin 30 thereof could be extended above the end of the thermoplastic material 43 and the provision for offset block 27 dispensed with.

It was earlier mentioned that the bottom wall 28 of the refractory vessel 24 might also be protectively lined with moly. This feature is described hereinafter with reference to FIGS. 9 and 10. In addition, tamp or chrome oxide refractory could be used as a bottom wall material. While the latter alternatives are not necessarily preferable because they may be swept along and mix with the glass, they are possible and useful alternatives for some types of glasses. Chrome oxide being electrically conductive would render impractical the use of bottom electrodes.

The absence of a moly bottom for liner 30 is generally preferred except when melting very corrosive or viscous glasses which require high temperatures, because its absence allows for the flexibility of operation with bottom electrodes. It also reduces the cost of construction of the furnace 10. Further, since for the most part the bottom wall 28 is protected by settling corrosion products, the provision for a bottom liner might not be necessary unless extremely high temperatures are required. On the other hand, since, the present invention is practical with or without the protection accorded by a bottom for liner 30, a bottom lined furnace will be described further in the specification.

Referring now to another feature of the present invention, it is intended that batch materials forming a batch blanket 110 may be added to the furnace 10 over the thermoplastic material 43 in a continuous fashion. Bearing this in mind, it is important that the furnace is operated in such a manner that the fusion line 111, separating the batch blanket 110 and molten material 43, extends across the furnace 10 above the level of flange 33 of liner 30. By always keeping a layer of molten material over flange 33, the liner 30 is protected from oxygen and gaseous products contained within the batch blanket 110. Upper edge 31 of liner 30 may protrude into batch material 110 and will become oxidized since it will not be covered by molten glass. However, the trap 29 formed by upper edge 31 and block 27 is useful mainly for startup purposes and oxidation of upper edge 31 thereafter creates no deleterious effects.

In order to further explain the important features of the present invention it is necessary to understand the start-up procedure. Conventional furnaces having liners which are susceptible to oxidation are purged with an inert gas during start-up and thereafter as the furnace is operated. Small scale units for specialty glasses may be operated under vacuum. Such arrangements are difficult to upsize, especially where thermal efficiency and economic factors make vacuum and purge gas arrangements unattractive.

In the present invention, start-up of the furnace 10 is similar to the start-up of a conventional vertical melter. Referring to FIG. 3, a cover 11 may be placed over the furnace 10 of a type similar to that normally used in conventional vertical melters. Burners 9 are located through the cover 11 and are fed fuel by gas lines 15 and combustion air through air lines 17 from some source not shown. The furnace 10 at start-up is normally partially filled with crushed glass, or cullet, up to the dotted line B, representing the angle of repose of the cullet (typically 45°). Preferably, the upper edge 31 of liner 30 is covered. As the material melts it settles and more cullet is added through openings 19. If available, floor electrodes 40 are energized after the batch is at least partially melted. Once the furnace 10 is full of molten thermoplastic material (see glass line G), the liner 30 is protected from oxidation.

During start-up, purge gas P may be forced into furnace 10 under pressure through an inlet pipe 63 which is sealed or welded in opening 65 in the bottom wall 16 of shell 14. The purge gas P may be used to fill the space within the shell 14 to protect the equipment from oxidation. Since the shell is sufficiently air tight, the purge gas P will be reasonably confined in the furnace 10 and guarantee, at nominal cost, the safe and effective start-up of furnace 10. Once the furnace is filled with molten glass, the purge gas may be turned off.

In the present invention, in order to further protect the liner 30 from oxidation, the burners 9 are operated in such a way that the combustion products contain no excess oxygen and the melt of initial cullet B is accomplished under reduced or neutral atmospheric conditions. Highly reduced fires are not believed desirable since it is thought that, for certain glasses, carbon contamination of the liner 30 may be harmful to glass quality.

Once sufficient material is melted the burners 9 may be shut down, and the bottom electrodes 40 may be energized to maintain the temperature of the furnace. Thereafter the cover 11 is removed and the batch electrodes 50 and 80 are inserted at their respective positions (see FIGS. 1, 2, 4 and 5). Batch materials 110 may then be continuously added to the furnace 10 as molten material 43 is removed from the bottom through outlet pipe 100.

Fill control means, not shown, may be provided to maintain the batch 110 at a desired orientation especially in the zone of the trap 29. The preferred method of operation is to have the ability to control fill and the hydrostatic head of glass. Then the fusion line 111 can be controlled by the combination of fill, head, and vertical adjustment of electrodes 50 and 80.

In FIG. 2 there is illustrated a schematic of one possible electrode arrangement of the present invention. The bottom electrodes 40 are illustrated by the circles, the batch electrodes 50 are illustrated by the crosses and the center batch electrodes 80 and outlet pipe 100 electrode are respectively illustrated by a circle about a cross. The bottom electrodes 40 may be fired in a closed delta configuration so that each fires to its next adjacent electrode, as shown by phasor arrows 40' between each of the electrodes 40. Similarly, the batch electrodes 50 may fire one to the other in a closed delta configuration superimposed over the first mentioned firing pattern, either in the same sense or the opposite sense of the bottom electrodes 40, as illustrated by the phasor arrows 50'. The electrodes 40 and 50 are preferably arranged away from the walls of the liner 30 to concentrate heat near the center of the furnace. In the arrangement shown there is electrical symmetry due to the superimposed or double delta firing and physical symmetry because the electrodes 40 and 50 are circumferentially staggered. The same firing pattern and symmetry would occur if three additional batch electrodes were substituted for floor electrodes 40.

The symmetry referred to above is important for melting efficiency and uniformity. In addition by placing and firing the electrodes 40 and 50 symmetrically, the liner will operate essentially at neutral or ground potential. Thus, the risk of destructive current flow from liner 30 to shell 40, also operating at ground potential, is minimized and glass seepage through insulation 20A-B to the shell can be tolerated.

In conventional vertical melters, exterior walls of the refractory vessel are cooled to slow down the corrosion of the vessel itself. The present invention, however, utilizes the insulation 20 to retain the heat within the furnace 10, while the liner 30 resists high temperature corrosion. The insulated nature of the furnace 10 allows for greater energy efficiency and higher temperature operation thereby significantly improving melt rates. Since the refractory of furnace 10 is protected by liner 30, it is capable of withstanding higher operating temperatures allowing the use of insulation 20. Even if the glass contact refractory in wall 26 becomes softened by the extreme heat of the furnace, the intermediate layer of tamp 21 will retard leakage of glass into the insulation 20. The various protective layers of materials successively limit the destructive impact of the corrosive material on the furnace 10. In addition, where convection currents are likely to cause deterioration of the furnace 10, the convection is restricted or confined. For example, general convection flows of material in chamber space 46 are restricted from the walls 26 of refractory vessel 24 by liner 30 and the space 32 between the liner 30 and the shell 12 is limited so any movement of materials therein is inhibited. This is especially true if a high viscosity material is located in space 32.

The same result would occur if as previously mentioned the refractory 26, tamp 21, and insulation 20A and 20B were replaced by sand, cullet, tamp or ground up refractory, or mixtures thereof. Although heat losses would increase, electrical losses would be about the same because the liner operating at ground potential would not be a current source.

Another feature of the present invention as shown in FIG. 1 is that the sidewall 14 of shell 12 may be directly coupled to a ground or neutral potential and monitored. This provides important safety benefits. A ground strap 49 couples sidewall 14 to ground G as a precaution. A current detector 48 monitors the current flow from the sidewall 14 to ground G. If current flow occurs in strap 49 it is a sign that the sidewalls are no longer isolated. When this occurs the operator should cut ground strap 49 to prevent further leakage to ground and erect a cage or barrier not shown about the furnace to protect personnel. The additional precaution of operating and placing the electrodes so that liner 30 operates at ground is a feature not available in conventional furnaces. The bottom 16 of shell 12 is not grounded and normally floats at some voltage V. Insulating shim 13 isolates the bottom 16 from sidewall 14 and similar insulating shims 25 isolate "I" beams and associated support structures from the floating voltage carried on bottom 16.

Figure 6:
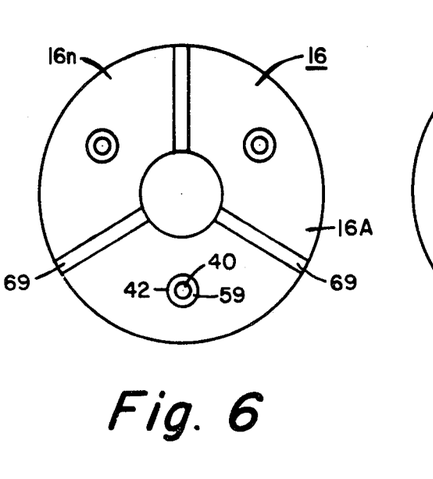
FIG. 6 is a bottom view of the furnace of FIG. 3 illustrating the electrical isolation of bottom plates and electrodes.

As shown in FIG. 6, the bottom wall 16 of shell 12 may be divided into a number of sections 16A . . . 16n (three shown). If bottom electrodes 40 are used, they may be sleeved through the bottom wall 16 through openings 42. The electrodes 40 are each isolated from the bottom wall 16 by means of a nonconducting sleeve 59. Each section 16A-16n of bottom 16 is isolated from another by an insulation shim 69. Thus, if a short develops between electrode 42 in section 16A of bottom 16, current will not be conducted to adjacent electrodes. Further if more than one electrode shorts to a respective bottom wall section 16A-16n, there will not be a catastrophic short from one electrode to another. Normally if a short to bottom wall 16 should occur, it occurs near openings 42 which may have become filled with hot glass. Thus a sectional bottom wall 16 is a prudent measure. If glass should penetrate into shell 12, operation can still continue although with increased heat and electrical losses. Because various shell portions are separated, a destructive failure may be avoided. Similarly, glass flow to bottom wall 16 of shell 18 will not cause a destructive current flow to ground because "I" beams 18 are isolated therefrom. Although not shown, segmentation of bottom wall 16 may include sections not having an electrode placement therethrough.

It is presently contemplated that the furnace of the present invention will operate with maximum temperatures of 1700°-2000° C. As a general rule, the melting rate of a glass furnace doubles for every 100° C. increase in temperature. Thus, the furnace described herein would have the same capacity as a conventional electrically fired unit two to four times larger. Conversely a conventional electrically fired furnace the same size as that of the present invention would only produce about half the glass output thereof. For example, a 12 foot diameter conventional electric furnace could be replaced by a furnace of the type described herein that is only about 6 to 9 feet in diameter. Furthermore the height of this furnace would be significantly less than that of a typical vertical melter. A shallow furnace is preferred since it is easier to build and requires less structural material for the lower head of glass confined therein.

In addition, because of the higher temperatures practically attainable, very hard glasses may be economically melted in large quantities. Further, entirely new and only theoretical compositions may be attempted.

The embodiment of the furnace 10 described herein is a relatively small polyhedral melting unit having a diameter of approximately 4 feet and depth of about 3 feet. Presently the furnace has operated at and is capable of melting a Corning Code 7073 borosilicate glass at a rate of 1.5 sq. ft. per ton. These figures are significant when compared with melting rates of conventional furnaces which range from 6-12 sq. ft. per ton for gas fired regenerative types to about 3.0 sq. ft. per ton for a vertical electrically fired glass melting unit.

It is conceivable that this unit could economically melt soda lime glass at a melting rate of 0.75 sq. ft. per ton and possibly 0.50 sq. ft. per ton. With such results, it has been theorized that a relatively large capacity furnace of the type described herein would be useful in a so-called float glass operation thereby eliminating the necessity for the large conventional float furnace.

A fully lined furnace of the type described herein should produce no refractory cord, and would require only about $2.25 \times 10^6$ BTU/ton, while a conventional gas regenerative float furnace may require about $5-7 \times 10^6$ BTU/ton and can produce cord and consequent quality diminution. In addition, as the conventional furnace wears due to usage, the efficiency deteriorates further, whereas in the system contemplated herein, the furnace remains at its high efficiency level for virtually its entire useful life because of its superior wear characteristics.

Figure 7:
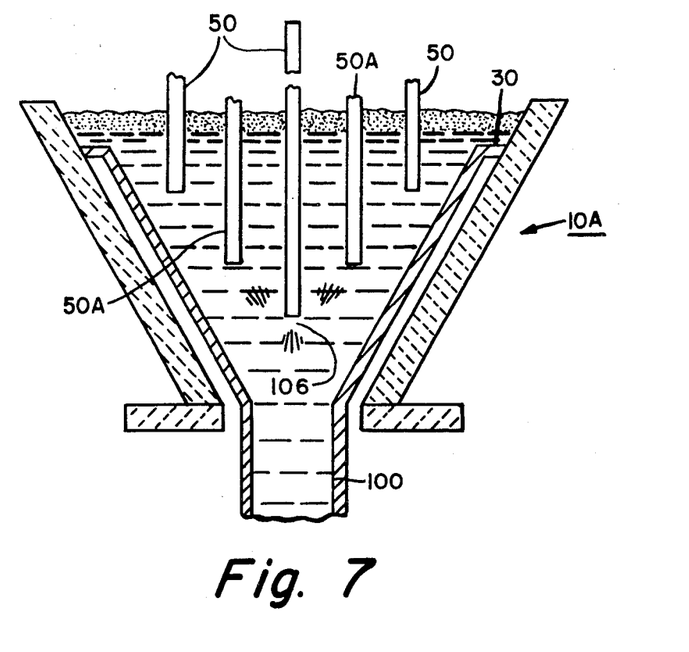
FIG. 7 is a schematic side sectional view of an alternative embodiment of the invention.
Figure 8:
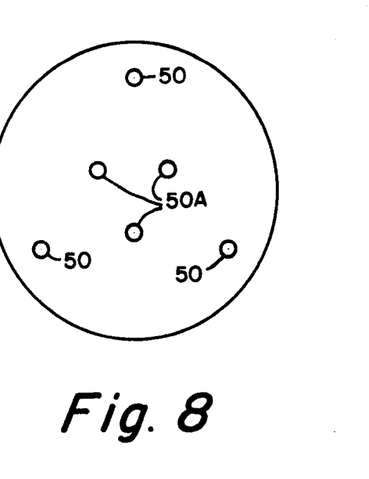
FIG. 8 is a top plan schematic showing an electrode arrangement suitable for the furnace shown in FIG. 7.

It should be understood that the shape of the furnace 10 and interior liner 30 can be any one of many conceivable arrangements from circular to polyhedral and square or rectangular in plan view. Further the side walls may be slanted to form a conical structure to control convection currents and/or to move the upper margins of the furnace away from the center, while maintaining the hot central zone with a smaller concentrated body of glass. The features of the invention for protecting the liner and refractory vessel, however, remain essentially the same. A furnace 10A as shown in FIG. 7 could conceivably include a conical liner 30A coupled directly to exterior outlet pipe 100 without an upstanding outlet electrode portion 103 above the floor 28 (see FIG. 1). Hot spot 106A could be achieved by closely arranged and deeply immersed batch electrodes 50A. Batch electrodes 50 as previously described in FIG. 1 could be located above and staggered between the electrodes 50A (see also FIG. 9). The electrodes 50 may also be less deeply immersed and radially spaced further from the center C of the furnace 10A.

Figure 10:
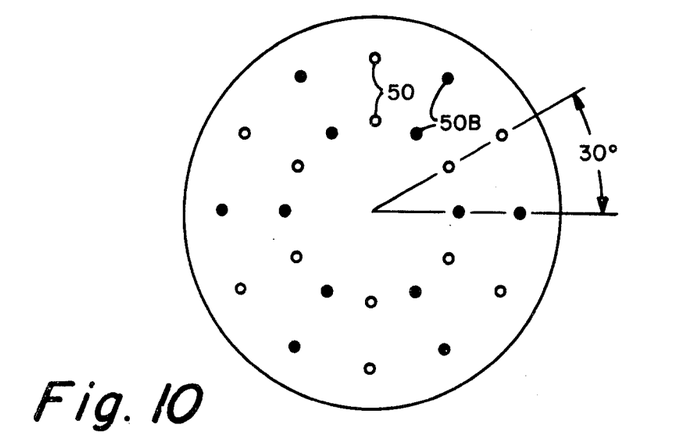
FIG. 10 is a diagram for the electrode arrangement of the furnace of FIG. 9.

In another embodiment of the present invention illustrated in FIGS. 9 and 10 there is provided a furnace 10B including an exterior shell 12, a layer of insulation 20, a refractory vessel 24, and a liner 30B separated from vessel 24 by a narrow space 32. The vessel 24 includes upstanding sidewalls 26 and floor 28. Liner 30B includes sidewalls 72 and floor 74 as well as upper outstanding exterior flange 33 described hereinabove.

Refractory vessel floor 28 may be slightly inclined downwardly toward outlet 100 as shown, and separated from liner floor 74 by a relatively narrow space 76. In order to maintain the space 76, various supports may be provided. The outer peripheral edge of floor 74 is supported by an inwardly extending flange portion 84 projecting from sidewalls 72. It should be noted that floor 74 could be welded or joined to sidewalls 72 of liner 30B or simply rest on the flange 84 as shown. Intermediate supports or shims 94 are located in recesses 95 in vessel floor 28. A central support 98 in the shape of an annular tube has a radially extending flange 99 which supports an inboard portion 97 of liner floor 74. Central support 98 rests in an inboard recess 94A of floor 28. Flange 84, shims 94 and central support 98 may be fabricated from any suitable material including refractory and moly as desired. The space 76 is normally filled with thermoplastic material to protect the liner. The various supports for floor 74 maintain the space 76 and prevent the protective material from being forced out.

A connector 93 extends through the bottom wall 16 of shell 12 and the floor 28 of vessel 24 and is coupled to liner floor 74. A distal end of connector 93 is coupled to a source of power to thereby electrify the liner floor 74. Other portions of liner 30B may be electrified with additional connectors 93 (not shown) to assure good electrical symmetry. Electrical heaters 104 may be located at various locations including the spaces 32 and 76 between the liner 30B and refractory vessel 24, the slot 36 in floor 28 of vessel 24 and annular space 96 about outlet 100 for startup and furnace control.

A pair of batch electrodes 50 supported by arm 87 are located above furnace 10B and extend through batch blanket 110 into fusion zone below line 111. In a preferred embodiment multiple pairs of batch electrodes 50B are located at 30° or 60° intervals about the furnace (see FIG. 10). While batch electrodes 50B are shown in pairs other arrangements and combinations of singlets, triplets, etc. may be used. The preferred arrangement is to locate one or more electrodes in sets 50-50B along radial lines to cover the furnace projection symmetrically. In FIG. 10 notice the relatively close electrical spacing resulting from the multiple sets of electrodes 50-50B. The arrangement allows the electrodes 50-50B to fire to each other and create closely coupled electrical currents therebetween. If the electrode spacing is symmetrical and the electrical firing balanced to produce relatively uniform temperature across the furnace, relatively small convection rolls will occur.

In FIG. 9 notice the symmetry that arises around the radial placement of electrodes. The electrodes 50 at different radii are powered so as to maintain more or less the same temperature at each respective radial portions thereof. Since the glass around each electrode 50 will be hotter than the surrounding glass, the glass movement beneath each electrode 50 will be vertically upward (see circular arrows O & I representing inner and outer convective rolls). Between electrodes 50, there will be descending glass currents. If the temperature is maintained about the same from the center of the furnace 10B to the liner 30B, then each electrode 50 will produce its own convective roll which will not be overpowered by a larger or dominant convective roll. The many small convective rolls move with lower velocity than larger convective rolls because of the greater shear stress therebetween. Hence the residence time of glass in the melter is increased. The depth of penetration of rolls is a function of glass viscosity at the melt temperature. Normally it is desirable to keep rolls small and maintain quiescence for fining in a lower portion of the furnace. However, it appears as though deep penetration of convection currents do not affect glass quality, especially in view of the fact that a center batch electrode (shown in FIG. 1) may be used for fining.

In FIGS. 1, 7 and 9, it should be noted that respective batch electrodes 50 and 50B are relatively close to the top of the furnace fusion line 111. By concentrating the heat high there, in the furnaces 10, 10A, and 10B, the molten glass therein does not tend to violently convect and heat is concentrated where needed i.e. near the batch 110. This is especially helpful with glasses which have a resistivity that varies rapidly with temperature (e.g. alumino-silicate glasses). More energy can be dissipated just below the batch blanket 110 to do a more efficient job of melting.

The arrangement of electrodes 50, 50A and 50B should be symmetrical. This is especially true in larger furnaces as for example the furnace 10B shown in FIGS. 9 and 10. The electrodes 50-50B therein may be located every 30° or 60° with alternate sets exhibiting different firing patterns, e.g. cross firing, peripheral firing, etc. Other combinations and arrangements are possible up to as close as 15° staggered spacing, but the arrangements shown are presently preferred.

Symmetrical firing of electrodes positioned close to the batch blanket has the advantage of producing vertical and horizontal temperature stability which has been found to result in more efficient use of energy and produce better quality product. Normally, in a glass melting furnace, freshly heated glass tends to rise because of a reduction in its density with increasing temperature. Similarly, cooler glass being more dense tends to move downwardly. Convective rolls or rolling movement of the melted glass are thus produced and maintained within the melt since the differential in glass density produces a driving force creating such rolling movement. In the present invention since the heat is placed high in the furnace, just below fusion line 111, the heated glass tends to remain near the top of the furnace. Of course some cooling will occur and glass will flow downwardly causing convection, but since the glass is heated near the top of the furnace its initial motion is restricted, thereby reducing displacement of other glass nearby. The tendency of the newly heated glass to remain near the top of the furnace is reinforced because it is at a location where it is closest to equilibrium and is not being rapidly displaced and cooled.

Uniformity of horizontal temperature distribution results in suppression of one major convective roll from the hot side to the cold side of the furnace. By balancing heat input horizontally there is less of a tendency for any portion of the furnace to produce excessive heating or cooling of glass which encourages convection.

The present invention may further include a system without a liner bottom having floor electrodes as in FIG. 1 but disposed in pairs, triplets, etc. along radial lines, such as shown by the arrangement in FIG. 10.

Many furnace sizes are possible from the relatively small arrangement of FIG. 1 (4' diameter) to the large unit shown in FIG. 9 (10-30 feet in diameter). Larger versions are possible too, however, the number of electrodes might be increased as the diameter increases. Further it might be necessary to introduce a staggered set of multiple electrodes intermediate the sets hereinabove described.

It is intended that features of each of the embodiments set forth herein may be incorporated in and be interchangeable with each other. For example, the layer of refractory ramming mix 21 shown in FIGS. 1 and 3 may also be incorporated in the other embodiments. As there are many such important interchangeable features the above is merely exemplary and illustrative and is not intended as a limitation herein.

There has therefore been described what at present are considered to be the preferred embodiments of the present invention, and it will be obvious to those skilled in the art that various changes and modifications may be made therein without departing from the invention, and it is intended in the appended claims to cover all such changes and modifications as fall within the true spirit and scope of the invention.

What is claimed is:

1. A method of operating a furnace having an oxidizable protective liner wherein batch materials containing within interstices thereof trapped deleterious gaseous constituents are fusible into a mass of molten thermoplastic material within said furnace, the method comprising the steps of: depositing said batch materials within said furnace, firing said furnace with a mixture of fossil fuel and air, regulating said air to fuel mixture to marginally stoichiometric conditions such that the fuel is fired under a neutral condition relative to oxidation thereby protecting the oxidizable liner from oxidation due to combustion air and the gaseous materials trapped between the interstices of said batch material.

2. The method of claim 1 further including the step of maintaining a level of said batch materials above the level of an upper extent of said liner such that upon firing to the molten state the thermoplastic material provides protection to the oxidizable liner.

3. The method of claim 1 further including the step of introducing purge gas inert relative to the liner into said furnace during start-up; and saturating space about the liner with said purge gas to thereby drive out deleterious ambient elements.

* * * * *